Patented Feb. 20, 1923.

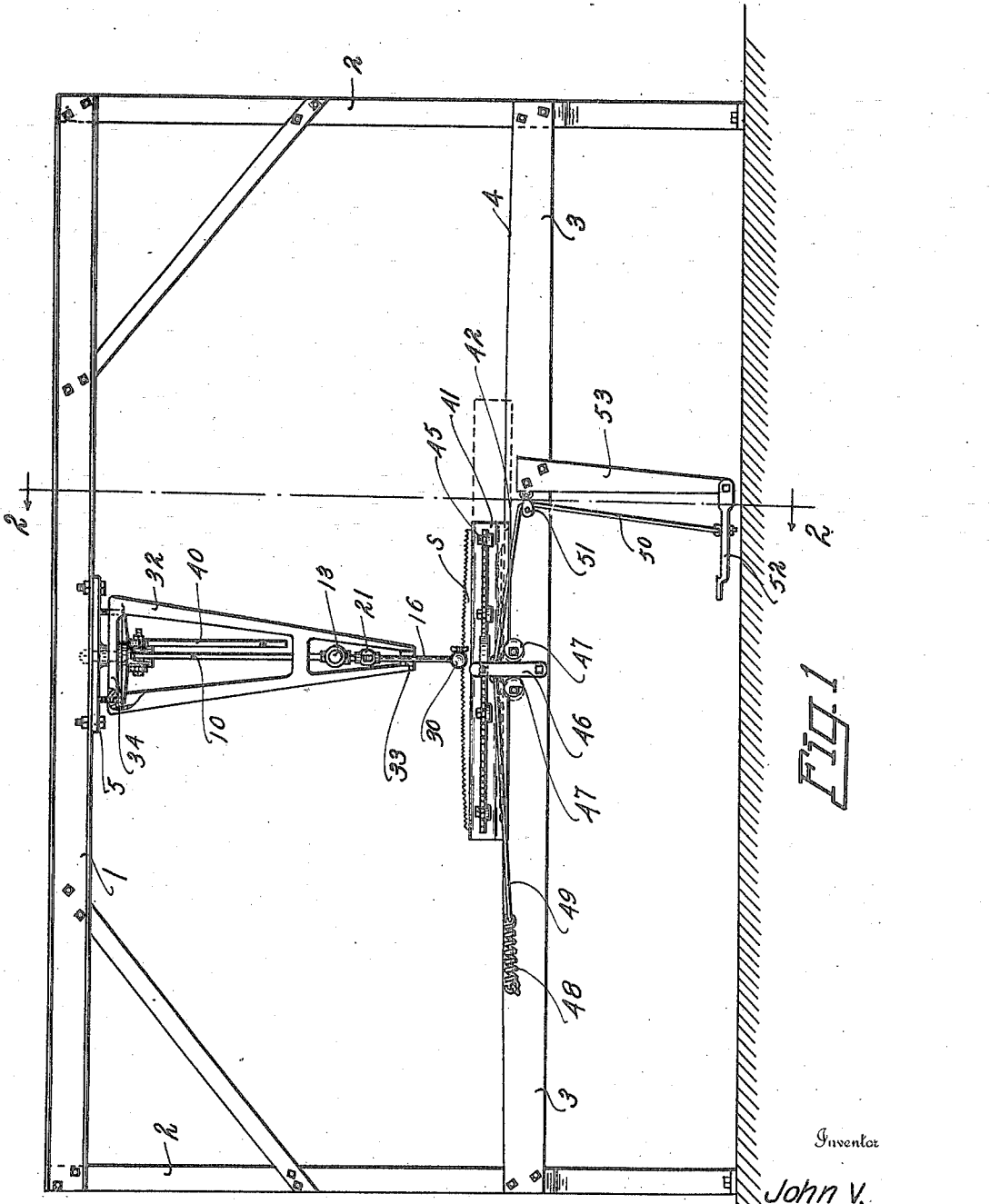

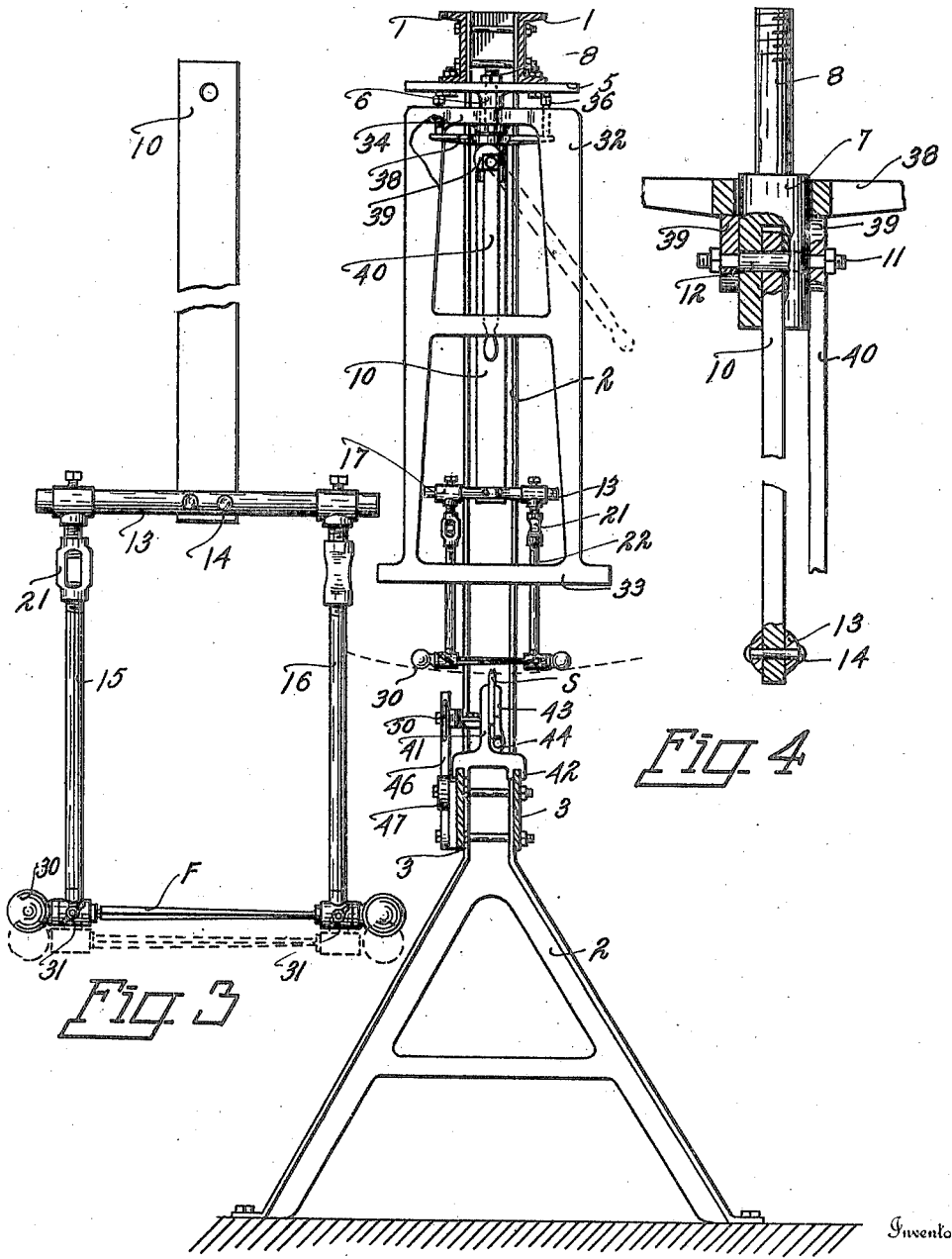

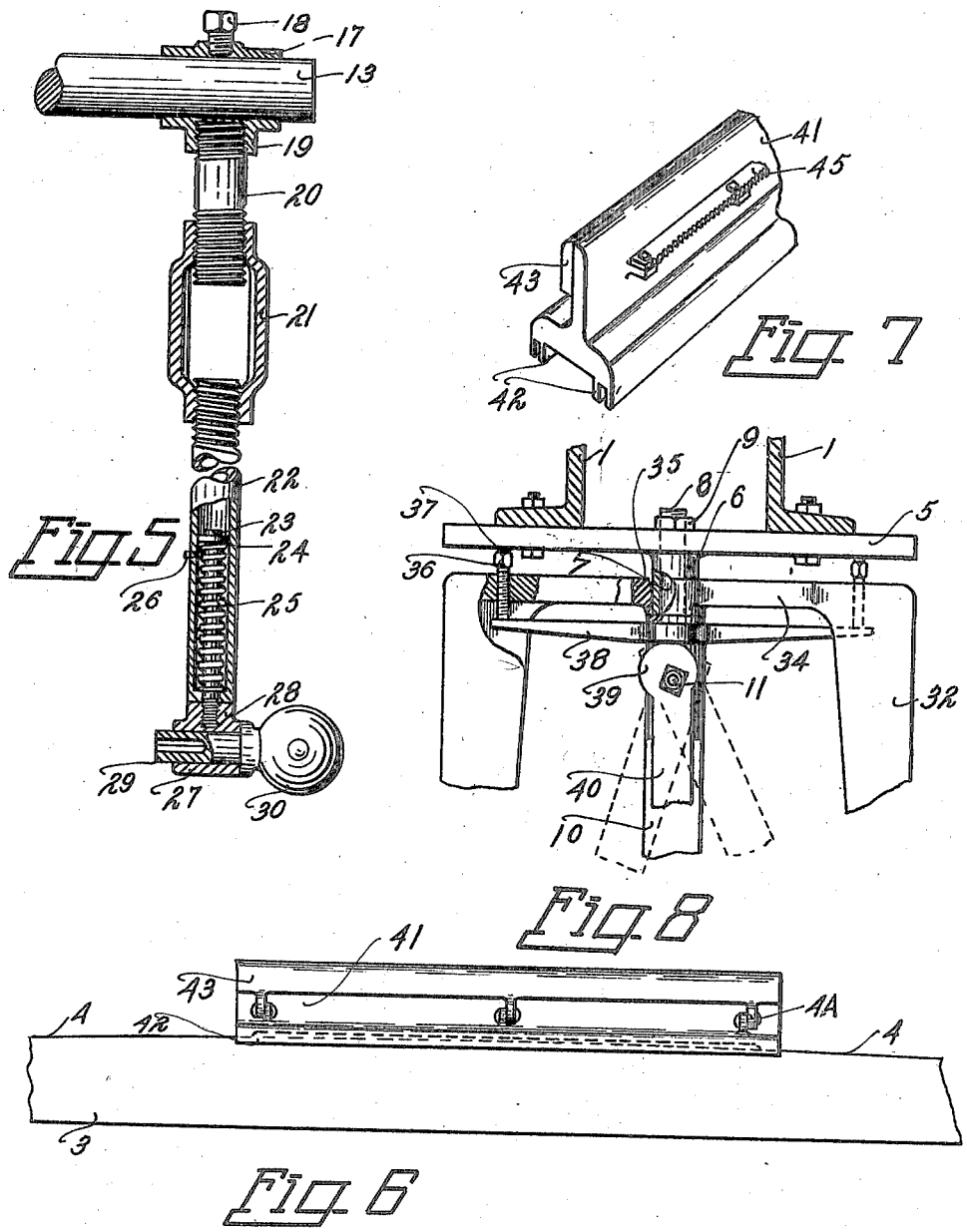

1,445,790

UNITED STATES PATENT OFFICE.

JOHN V. MULKS, OF HILLYARD, WASHINGTON.

SAW-FILING MACHINE.

Application filed March 9, 1921. Serial No. 450,849.

*To all whom it may concern:*

Be it known that I, JOHN V. MULKS, a citizen of the United States, residing at Hillyard, in Spokane county and the State of Washington, have invented certain new and useful Improvements in Saw-Filing Machines, of which the following is a specification.

My present invention relates to improvements in saw filing machines of the hand operated type, involving the use of a suspended holder for a sharpening tool or file that is reciprocable transversely of the saw to be sharpened, in combination with an intermittently movable saw carriage and clamp with mechanism for feeding the saw carriage step by step as the successive teeth of the saw are treated.

The primary object of the invention is the provision of a device of this character that is comparatively inexpensive in manufacture, possesses simplicity in construction and operation, which may be adjusted with facility for filing the teeth of the saw at various angles and to various depths, and in addition is adapted to provide a predetermined camber or crown for the saw blade as it is being sharpened.

With these and other objects in view the invention consists in certain novel combinations and arrangements of parts involving the sharpening tool and its various adjustments, and also the saw carriage and its feeding mechanism as will be hereinafter more fully described and claimed.

In the accompanying drawings I have illustrated one complete example of the physical embodiment of my invention in which the parts are combined and aranged according to the best mode I have thus far devised for the practical application of the principles of my invention.

Figure 1 is a front view of a manually operated saw filing machine, involving a pedal power for the saw carriage feed, constructed according to and embodying the principles of my invention.

Figure 2 is an enlarged view at line 2—2 of Figure 1, omitting the saw carriage feed mechanism, and illustrating the adjustable, swiveled, reciprocating file holder.

Figure 3 is an enlarged view of the file holder and its suspending arm, showing the lateral and vertical adjustments for the holder, the holder, in full lines being shown in position for its return stroke and in dotted lines shown in position for the working stroke of the file or sharpening tool.

Figure 4 is an enlarged detail view, partly in section showing the manner of suspending the oscillatable arm of the file holder and its swiveled, adjustable suspending means.

Figure 5 is an enlarged detail view, partly in section of a part of the file holder, showing the provision for lateral adjustment to fit different lengths of files, and one of the retracting springs for elevating the file on its return, or non-working stroke.

Figure 6 is a detail side elevation of the saw carriage and clamp.

Figure 7 is a detail view in perspective of one end of the saw carriage, showing also the clamp and rack bar on the carriage.

Figure 8 is a detail view, partly in section, showing the swiveled suspension of the file holder, and particularly the means for locking the holder in adjusted position in connection with the fixed suspension plate for the holder.

In the drawings which show the preferred form of my invention I have illustrated a machine frame, comprising a pair of parallel channel plates 1, 1 disposed horizontally at the proper height and supported at their ends by the two uprights or posts 2, 2, bolted together and suitably braced. In addition I utilize the two parallel spaced guide plates 3, 3, for the saw carriage, which are fashioned with top edges 4 declining from the longitudinal center, for a purpose to be described. This structure is bolted together as usual to form a rigid support for the operating parts of the saw sharpening machine, the upper beams 2 being designed to support the file holder and the plates 3 standing on edge to support the saw carriage, as will be described.

At the proper location, and disposed at the under side of the two beams 1, a suspending plate 5 is bolted to form a rigid support for the file holder, and at its underside the plate is fashioned with an integral, central, tubular boss 6, adapted to suspend the swiveled head 7 by its threaded bar 8. The bar 8 is inserted through the boss and plate, and at the top of the plate a nut 9 is threaded on the end of the bar or bolt 8, to suspend the head, but permit it to revolve or oscillate in a horizontal plane. The head 7 is bifurcated or forked to receive the upper end of the suspending arm 10 of the file holder, and is perforated to receive the suspending bolt 11 passed horizontally through the bifurcated swivel head, in order that the arm may swing on the bearing sleeve 12 which encases the bolt within the head and arm.

The file holder for the sharpening tool or file F in Figure 3, is a rectangular, vertically disposed frame including a top bar 13, which normally extends transversely of the supporting frame for the machine and has two depending, duplex, side bars 15 and 16. The frame is fixed to the suspending arm 10 at 14, and these two side bars depend from the top bar adjacent their ends.

As more clearly disclosed in Figure 5 the side bars of the file holder frame each comprises a laterally adjustable end sleeve or hanger 17 surrounding the top bar and adapted to be secured thereon by a set screw or bolt 18, and the hanger has a depending collar 19 for the reception of the threaded end of the screw bar 20, forming one section of the sectional, extensible side bar. At the lower end of the section 20 a turn buckle 21 is connected by its threads as usual, and below the turn buckle a hollow tubular section 22 is threaded in its lower end. The lower end of this tubular section is closed and perforated for the reception of a threaded stem or shank 23 which is located in the tubular section and provided at its upper end with a slide head 24. Between the slide head and the closed bottom of the tubular section a lifting spring 25 is interposed and coiled about the stem 23, and a pin 26 seated in a perforation in the wall of the tubular section limits the downward movement of the slide head on the stem.

At its lower end, the stem is threaded into a sleeve 27 having a threaded boss 28 for the purpose, and it will be apparent that the action of the spring is such as to hold the boss 28 in close contact with the lower, closed end of the tubular section, but the sleeve 27 may be withdrawn from contact with the tubular section against the tension of the spring.

The file F is thus suspended from the file holder by a resilient connection, and normally held in uplifted position. Within each of the sleeves 27 is located a keeper or socket 29, one for each end of the file and the socket member has a head or knob 30 to be grasped by the hand of the operator, and a set screw 31 in the sleeve 27 is designed to hold the sockets in their sleeves.

From this description it will be apparent that the file holder is suspended by its arm 10 from the bifurcated swivel head 7 and by this connection the holder may be swung transversely of the supporting frame. The operator grasps the file holder by the knobs 30, one in each hand, and swings the holder on its pivot 11 with a reciprocating motion, transversely of the saw S. On the working stroke of the file, the operator, by pressure on the knobs, depresses the file and its keepers, against the tension of the two springs 25, and the holder is swung away from the operator with the file in contact with the saw teeth. On the return or non-working stroke, the downward pressure on the knobs is released, and the springs elevate the file and its holders or keepers, the file thus avoiding the teeth of the saw on the inward stroke or movement of the file holder.

The reciprocal movement of the holder may be guided by the utilization of a guide frame 32, which has at its lower end a pair of spaced, parallel plates 33 between which the side arms of the holder swing, and this guide frame may be adjusted to position in order that the holder may reciprocate in a direction generally transverse to the saw, but at various angles thereto. Thus the guide frame is provided with an integral cross arm 34 having a central hub 35 that is fixed to rotate horizontally or swivel with the bifurcated head 7, but is free to slide on or be lifted with relation to the head. As best seen in Figure 8 a pair of diametrically arranged stop bolts 36 are screwed into the cross arm of the guide frame and project a suitable distance thereabove in order to contact with complementary abutments or studs 37, arranged in a circle or circular series about the center of the swiveled head and depending from the under face of the suspending plate 5 fixed to the supporting frame. The guide frame may be turned or oscillated in a horizontal plane and swing with it the file holder and bifurcated head, on the bolt 8 as a pivotal center, to bring the file at the proper or desired angle to the saw for filing its teeth, and when swung to the proper position the guide frame and its cross head may be elevated or lifted with relation to the holder and swivel head, to engage the bolts 36 with abutments 37, thus holding the frame, holder, and swiveled head in adjusted, angular position for operation of the file. The means for elevating the cross head and locking these parts embodies a horizontally arranged locking plate 38 on the swivel head in engagement with the lower ends of the locking bolts 36, within the guide frame, and a pair of cam disks 39 fixed to revolve with the bolt 11 in the swivel head and in frictional engagement with the under face of the cam plate, as indicated in Figure 8. One of these disks has a cam lever 40, and it will be apparent that by swinging the lever, as indicated in dotted lines Figure 8 the cam plate may be elevated carrying with it the guide frame and its bolts 36 to engage the abutments 37, and thus hold the frame in adjusted position.

By a reverse turn of the lever, the guide frame is freed to be depressed by gravity and may then be turned as desired.

The saw S in Figure 1 is supported by the saw carriage 41, which has a pair of spaced, grooved, parallel flanges 42 at its base to fit over and slide on the upper edges of the vertically disposed guide plates 3 spaced apart as shown in Figure 2. The carriage is of suitable length to accommodate different lengths of saws and is equipped with a clamp plate 43, hinged at 44 to swing out laterally of the carriage to receive a saw, and provided with suitable means for holding the saw between it and the carriage, as indicated in Figures 1 and 2.

The saw carriage with its clamped saw is fed intermittently or step by step as each successive saw tooth is filed, and for this purpose a longitudinally extending rack bar 45 is attached at the near side of the carriage, the number of teeth on the rack bar corresponding with the teeth of the saw. The feed actuating mechanism involves a pivoted pawl or ratchet 46, on one of the saw-carriage guide plates 3 to engage the rack bar 45, and two eccentric disks 47 are adjustably secured on the plate 3, one at each side of the ratchet, to limit the stroke of the ratchet with relation to the required movement of the saw carriage and the spaced teeth of the saw. The pawl is returned or retracted through the instrumentality of a spring 48 attached at one end to the front plate 3 and at its other end connected by a cord 49 to the ratchet or pawl as shown in Figure 1. The working stroke of the ratchet is accomplished through the pull cord 50 attached to the ratchet, passed around a guide pulley 51, and attached to a pedal or foot lever 52. The lever or pedal is pivoted on a bracket or hanger 53, and in position near the floor where it is readily accessible for pressure by the foot of the operator.

It will thus be apparent that after each working stroke of the file, by pressure on the pedal 52 the saw carriage is moved one step by action of the ratchet on the rack bar of the carriage, in order to bring a successive saw tooth in position for filing. The guide plates 3 which form the track for the saw carriage, decline, each from the center, on their upper edges or trackway, to compensate for the rounded or doubly inclined cutting edge of the saw as shown, thus presenting the toothed or cutting edge of the saw in proper position for action by the file, in order to secure the desired cambre or crown to the saw edge.

The side bars of the file holder may readily be adjusted laterally to accommodate the holder for different lengths of files, and the turn buckles may be utilized to vertically adjust the file holder and file to the required depth of tooth on the saw, and limit the depth of the cut. The file may be turned to the desired angle and secured within the keepers or sockets by the set bolts 31, to adjust the filing face to the tooth edge. And the file holder may be adjusted to the proper angle across the saw by adjusting the guide frame for the holder as described.

From the above description taken in connection with my drawings it will be apparent that I have provided a saw filing machine which may be operated with facility and a minimum expenditure of labor by a single operator and by means of which the saw may be sharpened with accuracy and dispatch.

Having thus fully described my invention, what I claim as new and desire to secure by Letters Patent is—

1. The combination with a pivoted, reciprocable file holder including vertically extensible side arms and means whereby said arms may be adjusted laterally, of a file keeper at the free end of each arm, and resilient connections between said arms and keepers to permit depression of the keepers and file during a working stroke of the holder.

2. The combination with a reciprocable file holder including spaced, tubular side bars, of a file keeper at the free end of each bar, a movable stem in each bar secured to a keeper, and a spring within each bar for supporting a stem, for the purpose described.

3. The combination in a reciprocable file holder with tubular side bars, of a file keeper and a resilient support therefor in each bar, for the purpose described.

4. The combination with the tubular side bars of a reciprocable file holder, of a spring supported stem in each bar, a sleeve attached at the lower end of each stem, a horizontally disposed keeper in each sleeve, and means for holding said sleeves in adjusted position.

5. The combination with the tubular side bars of a reciprocable file holder, of a spring supported stem in each bar and a sleeve attached to each stem, a file keeper rotatable and longitudinally movable in each sleeve, and means for retaining said keepers in adjusted position.

6. The combination with a fixed suspension plate and a swiveled head therein and an oscillatable file holder suspended in said head, of a guide frame rotatably supported on said head and vertically movable with relation thereto, means for elevating said frame, and co-acting means on said frame and plate for locking said frame, holder and head against turning when the frame is elevated.

7. In a saw filing machine the combination with a swiveled head, oscillatable file holder, and guide frame adapted to be elevated, of fixed abutments on a part of the machine, projections on the frame adapted to co-act with said abutments, and means for elevating said frame for engagement of said abutments and projections for the purpose described.

8. The combination with a fixed suspension plate, swiveled head, oscillatable file holder and vertically movable guide frame having projecting bolts, of a cam plate on said head engaging said bolts, cam actuating means for elevating said frame, and abutments on said suspension plate for co-acting with the bolts for the purpose described.

9. The combination in a saw filing machine, of a trackway and saw carriage thereon having a rack bar, a ratchet pivoted on said trackway to engage the rack bar, actuating means for the ratchet, and a pair of laterally disposed eccentric disks adjustable on the trackway for limiting the movement of said ratchet.

10. The combination in a saw filing machine of an intermittently movable saw carriage and actuating means therefor, a trackway for said carriage having an elevated center portion and declining ways extending therefrom, for the purpose described.

11. The combination in a saw filing machine of a movable saw carriage having spaced, grooved, base flanges, and means for moving said carriage, a pair of spaced tracks adapted to receive and support said grooved flanges, said tracks having an elevated center portion and declining toward their ends, for the purpose described.

In testimony whereof I affix my signature.

JOHN V. MULKS.